(12) United States Patent
Hauville et al.

(10) Patent No.: US 8,986,427 B2
(45) Date of Patent: Mar. 24, 2015

(54) METHOD AND APPARATUS FOR MONITORING AND ENSURING AIR QUALITY IN A BUILDING

(71) Applicant: FIPAK Research And Development Company, Rowley, MA (US)

(72) Inventors: Stephan Hauville, Rowley, MA (US); Antoine Hauville, Rowley, MA (US)

(73) Assignee: FIPAK Research And Development Company, Rowley, MA (US)

( * ) Notice: Subject to any disclaimer, the term of this patent is extended or adjusted under 35 U.S.C. 154(b) by 0 days.

(21) Appl. No.: 14/281,416

(22) Filed: May 19, 2014

(65) Prior Publication Data

US 2014/0338528 A1 Nov. 20, 2014

Related U.S. Application Data

(60) Provisional application No. 61/824,997, filed on May 18, 2013.

(51) Int. Cl.
*B01D 46/46* (2006.01)
*B01D 46/44* (2006.01)
*B01D 46/00* (2006.01)

(52) U.S. Cl.
CPC ............ *B01D 46/44* (2013.01); *B01D 46/0041* (2013.01); *Y10S 55/34* (2013.01)
USPC .............. 95/8; 95/25; 95/90; 95/273; 96/109; 96/111; 96/117; 96/417; 96/418; 55/385.2; 55/471; 55/DIG. 34

(58) Field of Classification Search
USPC ............ 55/385.1, 385.2, 471, 473, 481, 493, 55/DIG. 34; 95/8, 25; 96/18, 26, 109, 111, 96/117, 417, 223; 454/187, 139
See application file for complete search history.

(56) References Cited

U.S. PATENT DOCUMENTS

| | | | | |
|---|---|---|---|---|
| 5,443,625 A | * | 8/1995 | Schaffhausen | 95/113 |
| 7,462,220 B2 | * | 12/2008 | Farmer | 95/1 |
| 7,749,303 B2 | * | 7/2010 | Wright | 95/8 |
| 2001/0049927 A1 | * | 12/2001 | Toepel | 55/385.2 |
| 2009/0044703 A1 | * | 2/2009 | Bias et al. | 96/66 |
| 2009/0075582 A1 | * | 3/2009 | Wilkerson | 454/298 |
| 2009/0311951 A1 | * | 12/2009 | Walkinshaw | 451/261 |
| 2010/0294134 A1 | * | 11/2010 | Yokomizo et al. | 96/405 |
| 2012/0087087 A1 | | 4/2012 | Nicolai et al. | |

FOREIGN PATENT DOCUMENTS

| | | |
|---|---|---|
| EP | 2199695 | 6/2010 |
| WO | WO 2012/167280 | 12/2012 |

* cited by examiner

*Primary Examiner* — Duane Smith
*Assistant Examiner* — Minh-Chau Pham
(74) *Attorney, Agent, or Firm* — Pandiscio & Pandiscio

(57) ABSTRACT

Apparatus for transforming the air exchange load of a higher air exchange rate space into the air exchange load of a lower air exchange rate space, including: a housing; an air inlet and at least one air outlet formed in the housing; a passageway extending through the housing and connecting the air inlet to the at least one air outlet; a circulation fan disposed in the passageway so as to draw the air of the higher air exchange rate space into the air inlet, through the passageway, and return that air to the higher air exchange rate space through the at least one air outlet; and a filter disposed in the passageway for purging noxious substances from the air passing through the passageway, whereby to transform the air exchange load of a higher air exchange rate space into the air exchange load of a lower air exchange rate space.

30 Claims, 17 Drawing Sheets

METHOD AND APPARATUS FOR MONITORING AND ENSURING AIR QUALITY IN A BUILDING

REFERENCE TO PENDING PRIOR PATENT APPLICATION

This patent application claims benefit of prior U.S. Provisional Patent Application Ser. No. 61/824,997, filed May 18, 2013 by FIPAK Research And Development Company and Stephan Hauville et al. for METHOD AND APPARATUS FOR HANDLING AIR IN A LABORATORY BUILDING, which patent application is hereby incorporated herein by reference.

FIELD OF THE INVENTION

This invention relates to methods and apparatus for monitoring and ensuring air quality in a building. More particularly, this invention relates to methods and apparatus for monitoring air quality in a building, for ensuring air quality in a building, and for advising personnel in the event of possible issues with the air quality in a building. Among other things, this invention relates to methods and apparatus for handling air in a laboratory space (or other building space) where the presence of noxious substances (e.g., hazardous chemicals) would normally require an increased rate of air exchanges for that laboratory space (or other building space) in order to ensure the comfort and/or safety of the occupants.

BACKGROUND OF THE INVENTION

Modern building codes require that the air in a room of a building be circulated a minimum number of times in a given period of time in order to ensure the comfort and/or safety of the occupants, e.g., it is common for modern building codes to require a minimum of 2-4 air exchanges per hour for each room of the building.

However, in some areas of some buildings (e.g., laboratory spaces, hospital spaces, anatomy labs, animal care facilities, utility rooms containing heating systems and the like, garages, locker rooms, etc.), the presence of noxious substances (e.g., hazardous chemicals) may require a higher rate of air exchanges in order to ensure the comfort and/or safety of the occupants.

By way of example but not limitation, in a laboratory space where chemicals are handled on the open bench, without the protection of a fumehood, a higher rate of air exchanges (e.g., 8-12 air exchanges per hour) may be mandated in order to ensure the comfort and/or safety of the occupants. This higher rate of air exchanges is in addition to, and is not a substitute for, any fumehoods which may be provided in the laboratory space.

It will be appreciated that the higher rate of air exchanges for these laboratory spaces, while extremely important for the comfort and/or safety of the occupants, are nonetheless expensive due to the energy loss associated with the air exchange process. More particularly, the air exchanges are typically effected using the ambient air outside the building, and this outside ambient air must generally be conditioned (e.g., heated or cooled) before it is introduced into the laboratory space as replacement air for the laboratory space. This heating or cooling consumes energy, and energy is expensive. This is particularly true in colder and warmer climates, since more heating or cooling must be effected for the ambient outside air prior to introducing that air into the laboratory space as replacement air.

In view of this, it will be appreciated that energy costs are significantly higher for laboratory spaces (and/or other building spaces) which require an increased rate of air exchanges (e.g., 8-12 air exchanges per hour) than for those rooms which do not require an increased rate of air exchanges (e.g., only 2-4 air exchanges per hour).

Thus there is a need for a new approach for handling air in a laboratory space (and/or other building spaces) which would normally require an increased rate of air exchanges (e.g., 8-12 air exchanges per hour), in order to reduce the energy losses associated with the increased rate of air exchanges.

In addition, there is also a need for monitoring the air quality in a building, and particularly for monitoring the air quality in building spaces where noxious substances (e.g., hazardous chemicals) may be present, and for advising personnel in the event of possible issues with the air quality in those spaces.

SUMMARY OF THE INVENTION

The present invention provides a new approach for handling air in a laboratory space (and/or other building spaces) which would normally require an increased rate of air exchanges (e.g., 8-12 air exchanges per hour), in order to reduce the energy losses associated with the increased rate of air exchanges.

In addition, the present invention provides a new approach for monitoring the air quality in a building, and particularly for monitoring the air quality in building spaces where noxious substances (e.g., hazardous chemicals) may be present, and for advising personnel in the event of possible issues with the air quality in those spaces.

In one preferred form of the invention, there is provided apparatus for transforming the air exchange load of a higher air exchange rate space into the air exchange load of a lower air exchange rate space, said apparatus comprising:
  a housing for mounting to a surface of the higher air exchange rate space;
  an air inlet formed in said housing;
  at least one air outlet formed in said housing;
  a passageway extending through said housing and connecting said air inlet to said at least one air outlet;
  a circulation fan disposed in said passageway so as to draw the air of the higher air exchange rate space into said air inlet, through said passageway, and return that air to the higher air exchange rate space through said at least one air outlet; and
  a filter disposed in said passageway for purging noxious substances from the air passing through said passageway, whereby to transform the air exchange load of a higher air exchange rate space into the air exchange load of a lower air exchange rate space.

In another preferred form of the invention, there is provided a method for handling the air exchange load of a higher air exchange rate space in a building having an air exchange system, said method comprising:
  providing apparatus for transforming the air exchange load of a higher air exchange rate space into the air exchange load of a lower air exchange rate space, said apparatus comprising:
    a housing for mounting to a surface of the higher air exchange rate space;
    an air inlet formed in said housing;
    at least one air outlet formed in said housing;
    a passageway extending through said housing and connecting said air inlet to said at least one air outlet;

a circulation fan disposed in said passageway so as to draw the air of the higher air exchange rate space into said air inlet, through said passageway, and return that air to the higher air exchange rate space through said at least one air outlet; and a filter disposed in said passageway for purging noxious substances from the air passing through said passageway;

positioning said apparatus in the higher air exchange rate space, and operating said apparatus so as to transform the air exchange load of a higher air exchange rate space into the air exchange load of a lower air exchange rate space; and operating the air exchange system of the building so as to provide a lower air exchange rate to the higher air exchange rate space.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The present invention provides a new approach for handling air in a laboratory space (and/or other building spaces) which would normally require an increased rate of air exchanges (e.g., 8-12 air exchanges per hour), in order to reduce the energy losses associated with the increased rate of air exchanges.

More particularly, the present invention provides a novel air treatment device which purges noxious substances (e.g., hazardous chemicals) from the air of a laboratory space (and/or other building spaces such as hospital spaces, anatomy labs, animal care facilities, utility rooms containing heating systems and the like, garages, locker rooms, etc.). The novel air treatment device is installed in a laboratory space (and/or other building spaces) which would normally require an increased rate of air exchanges (e.g., 8-12 air exchanges per hour) in order to allow the laboratory space (and/or other building spaces) to be operated at a reduced rate of air exchanges (e.g., 2-4 air exchanges per hour) while still ensuring the comfort and safety of the occupants. Thus, by using the novel air treatment device of the present invention in a laboratory space (and/or other building spaces) which would normally require an increased rate of air exchanges, the rate of air exchanges for the laboratory space (and/or other building spaces) may be reduced, whereby to reduce the energy losses associated with the air exchange process.

In addition, the present invention provides a new approach for monitoring the air quality in a building, and particularly for monitoring the air quality in building spaces where noxious substances (e.g., hazardous chemicals) may be present, and for advising personnel in the event of possible issues with the air quality in those spaces.

Figure 1:
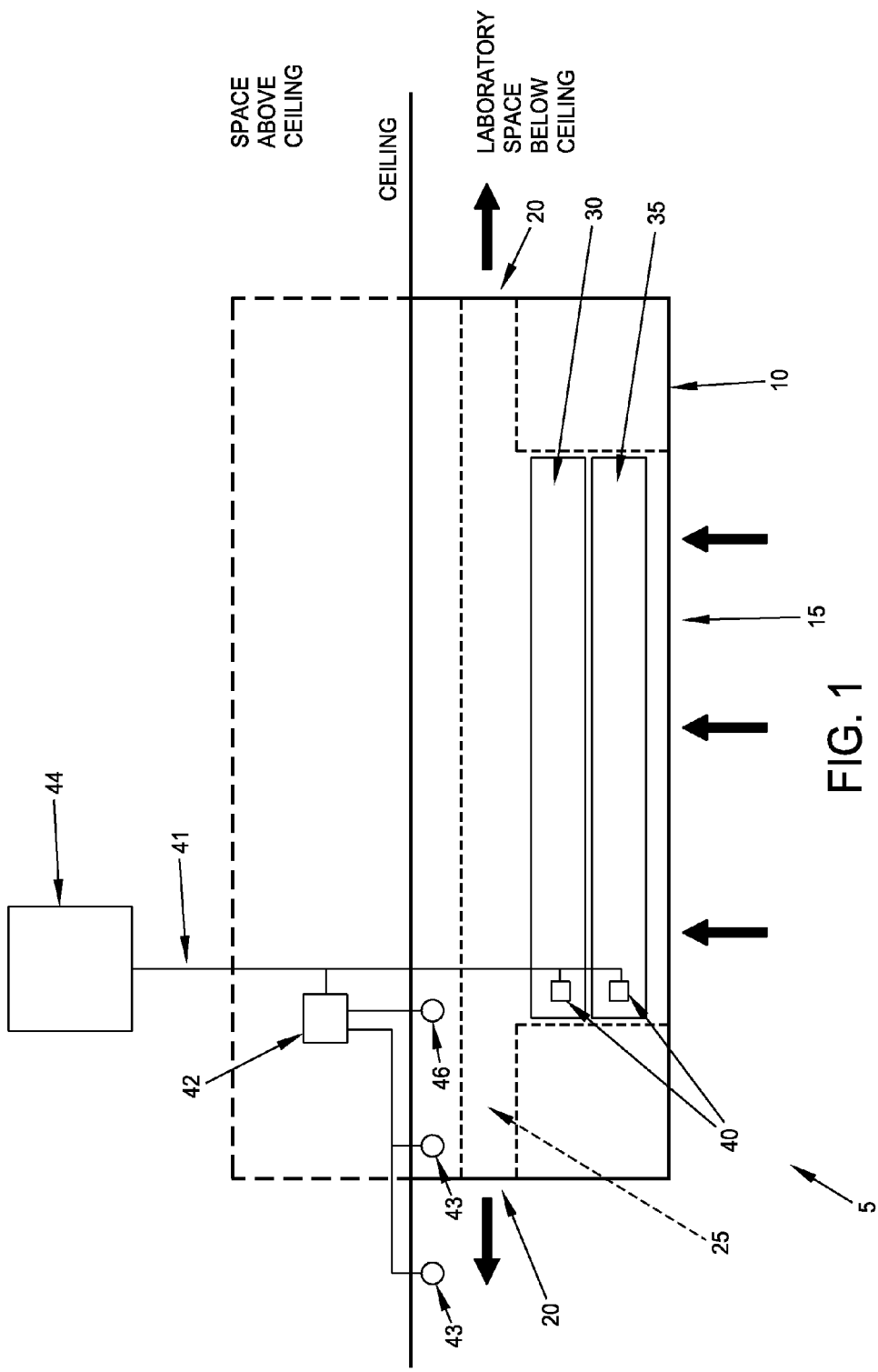
FIG. 1 is a schematic view of a novel air treatment device formed in accordance with the present invention.

In one form of the invention, and looking now at FIG. 1, there is provided a novel air treatment device 5 which comprises a housing 10 which is preferably secured to the ceiling of a laboratory space (and/or other building spaces such as hospital spaces, anatomy labs, animal care facilities, utility rooms containing heating systems and the like, garages, locker rooms, etc.). Housing 10 defines an air inlet 15, at least one air outlet 20, and a passageway 25 extending through housing 10 and connecting air inlet 15 with the at least one air outlet 20. A circulation fan 30 is disposed in passageway 25 so as to draw the air of a laboratory space (and/or other building spaces such as hospital spaces, anatomy labs, animal care facilities, utility rooms containing heating systems and the like, garages, locker rooms, etc.) into air inlet 15, move that air through passageway 25, and then return that air to the laboratory space (and/or other building spaces such as hospital spaces, anatomy labs, animal care facilities, utility rooms containing heating systems and the like, garages, locker rooms, etc.) through the at least one air outlet 20. Air inlet 15, the at least one air outlet 20, passageway 25 and circulation fan 30 are configured so as to ensure that substantially all of the air in a given space is circulated through novel air treatment device 5 on a regular and frequent basis.

In accordance with the present invention, novel air treatment device 5 includes a filter 35 which is adapted for purging noxious substances (e.g., hazardous chemicals) from air. More particularly, filter 35 is disposed in passageway 25 so that air from a laboratory space (and/or other building spaces such as hospital spaces, anatomy labs, animal care facilities, utility rooms containing heating systems and the like, garages, locker rooms, etc.), passing through passageway 25, is filtered by filter 35, whereby to remove noxious substances (e.g., hazardous chemicals) from the air of the laboratory space (and/or other building spaces). Thus, novel air treatment device 5 draws in the air of the laboratory space (and/or other building spaces), filters that air so as to purge noxious substances (e.g., hazardous chemicals) from the air, and then returns the filtered air back to the laboratory space (and/or other building spaces), with substantially no loss of air and, significantly, with substantially no change in the heat content of the air.

As a result, inasmuch as novel air treatment device 5 removes noxious substances (e.g., hazardous chemicals) from the air of the laboratory space (and/or other building spaces such as hospital spaces, anatomy labs, animal care facilities, utility rooms containing heating systems and the like, garages, locker rooms, etc.), the rate of air exchanges for that laboratory space (and/or other building spaces) may be reduced from the increased rate of air exchanges (e.g., 8-12 air exchanges per hour) normally associated with that laboratory space (and/or other building spaces) to the "normal" rate of air exchanges (e.g., 2-4 air exchanges per hour) for a standard room in the building. In this way, the air exchange rate for a laboratory space (and/or other building spaces) which would traditionally require a higher rate of air exchanges (e.g., 8-12 air exchanges per hour) may be reduced to that of a room requiring a standard rate of air exchanges (e.g., 2-4 air exchanges per hour), whereby to significantly reduce the energy losses associated with the air exchanges.

In essence, novel air treatment device 5 effectively transforms the "air exchange load" of a "higher air exchange rate space" (e.g., one requiring 8-12 air exchanges per hour) into the "air exchange load" of a "lower air exchange rate space" (e.g., one requiring 2-4 air exchanges per hour), whereby to significantly reduce the energy losses associated with the air exchange process, while still ensuring the comfort and/or safety of the occupants.

Significantly, in addition to providing a reduction in the energy losses associated with the air exchange process, novel air treatment device 5 also provides higher quality air for the occupants of the laboratory space (and/or other building spaces such as hospital spaces, anatomy labs, animal care facilities, utility rooms containing heating systems and the like, garages, locker rooms, etc.). This is because novel air treatment device 5 actively purges noxious substances (e.g., hazardous chemicals) from the air of the laboratory space (and/or other building spaces), rather than simply diluting them with an increased rate of air exchange.

As discussed above, filter 35 is designed to purge noxious substances (e.g., hazardous chemicals) from the laboratory space air. More particularly, filter 35 is configured to remove chemicals from the air of the laboratory space, wherein those chemicals may comprise non-particulates, including fumes, vapors, volatiles, etc. In one preferred form of the invention, filter 35 is configured to remove at least one of solvents, acids and bases from the air of the laboratory space. In one particularly preferred form of the invention, filter 35 is configured to remove at least two of solvents, acids and bases from the air of the laboratory space.

Figure 2:
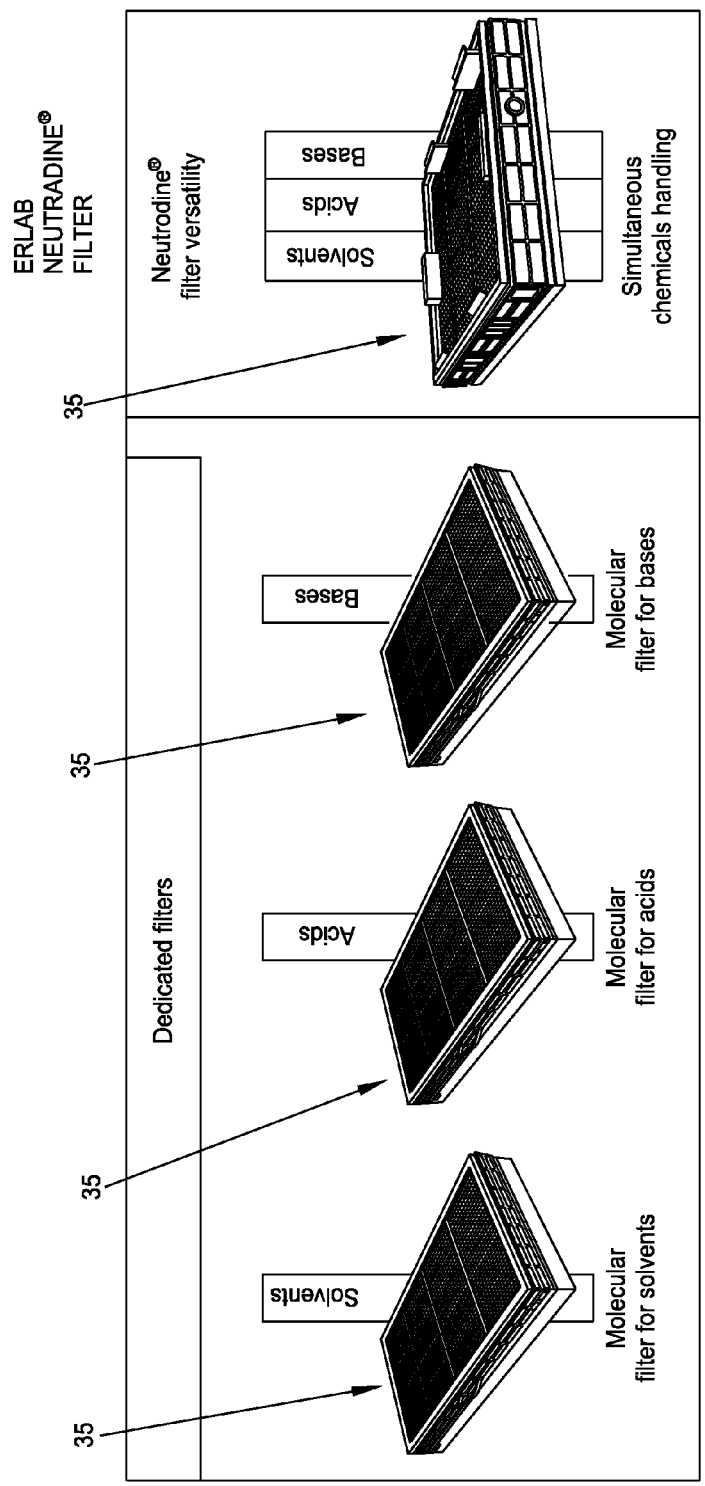
FIG. 2 is a schematic view of one preferred filter which may be used in the novel air treatment device shown in FIG. 1.

Filter 35 may be of the sort commonly utilized in ductless fumehoods. Preferably filter 35 is a Neutrodine® filter of the sort sold by Erlab of Rowley, Massachusetts, USA (see FIG. 2), which is a cassette-based, multi-stage filter capable of simultaneously handling a multitude of different chemical families, e.g., solvents, acids and bases. If filter 35 is not a cassette-based, multi-stage filter, it may comprise several independent filters arranged in series so as to ensure effective purging of noxious substances (e.g., hazardous chemicals).

It will be appreciated that one or more novel air treatment devices 5 may be used for each laboratory space (and/or other building spaces such as hospital spaces, anatomy labs, animal care facilities, utility rooms containing heating systems and the like, garages, locker rooms, etc.), depending upon the size of the laboratory space (and/or other building spaces) and the capacity of novel air treatment device 5. Thus, for example, in a typical chemistry laboratory of 1000 square feet, five novel air treatment devices 5 may be provided to service the laboratory space.

In one preferred form of the invention, novel air treatment device 5 includes one or more sensors 40 (FIG. 1) for monitoring proper function of the operational elements of the novel air treatment device (e.g., circulation fan 30 and filter 35, etc.), and these sensors 40 are preferably connected (e.g., by wire or wireless communication 41) to a monitoring system 42 for activating an alarm 43 (e.g., an audible alarm and/or a visual, light-based alarm) in the event that proper function of the operational elements (e.g., circulation fan 30 and filter 35, etc.) is interrupted.

Alternatively, or additionally, sensors 40 may be connected (e.g., by wire or wireless communication 41) to the master air control system 44 for the building. In the event that proper function of one or more of the operational elements (e.g., circulation fan 30, filter 35, etc.) of one or more novel air treatment device(s) 5 is interrupted, master air control system 44 for the building can automatically increase the rate of air exchanges for the affected laboratory space (and/or other building spaces such as hospital spaces, anatomy labs, animal care facilities, utility rooms containing heating systems and the like, garages, locker rooms, etc.), e.g., from the "normal" rate of air exchanges (e.g., 2-4 air exchanges per hour) to the higher rate of air exchanges (e.g., 8-12 air changes per hour), whereby to ensure the comfort and/or safety of the occupants of that laboratory space (and/or other building spaces).

In one preferred form of the invention, novel air treatment device 5 is mounted to the ceiling of the laboratory space (and/or other building spaces such as hospital spaces, anatomy labs, animal care facilities, utility rooms containing heating systems and the like, garages, locker rooms, etc.), so that the novel air treatment device does not interfere with normal space function and has ready access to the air in the laboratory space (and/or other building spaces). Note that where the laboratory space (and/or other building spaces) has a "drop-down" ceiling, a portion of novel air treatment device 5 may protrude up into the region above the "drop-down" ceiling.

Alternatively, novel air treatment device 5 may be configured to be mounted to a wall of the laboratory space (and/or other building spaces), or to both the ceiling and a wall of the laboratory space (and/or other building spaces).

Also, novel air treatment device 5 can be free-standing, e.g., housing 10 may be mounted to a base which sits on the floor of the laboratory space (and/or other building spaces).

Significantly, the present invention provides a new approach for monitoring the air quality in a building, and particularly for monitoring the air quality in building spaces where noxious substances (e.g., hazardous chemicals) may be present, and for advising personnel in the event of possible issues with the air quality in those spaces. To this end, novel air treatment device 5 preferably further comprises a sensor 46 for monitoring the air quality of the ambient air in the laboratory space (and/or other building spaces). Sensor 46 is preferably connected (e.g., by wire or wireless communication 41) to monitoring system 42 for activating alarm 43 (e.g., an audible alarm and/or a visual light-based alarm) in the event that the air quality of the ambient air in the laboratory space (and/or other building spaces) should deteriorate below a predetermined air quality level.

Figure 3:
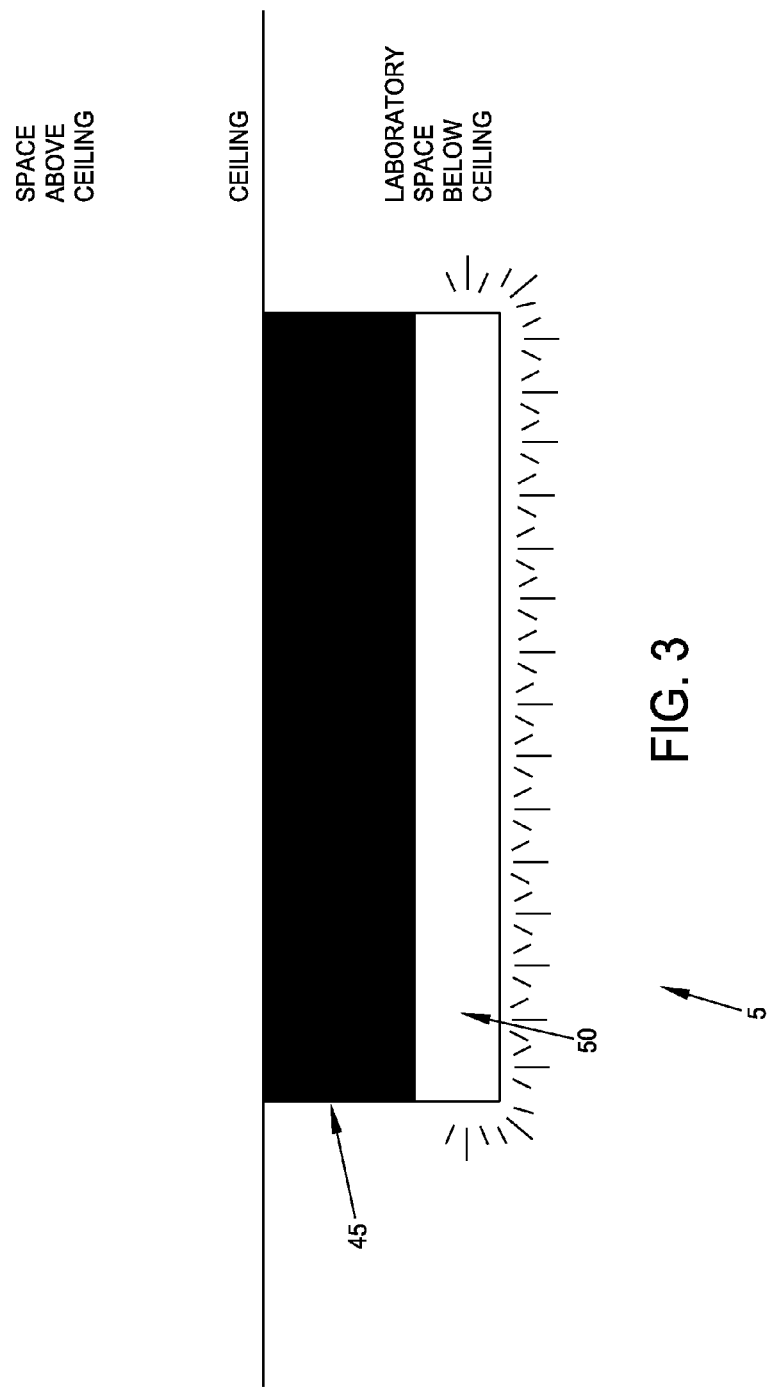
FIG. 3 is a schematic view of another novel air treatment device formed in accordance with the present invention.

If desired, in order to give novel air treatment device 5 a "weightless" appearance on the ceiling of the laboratory space (and/or other building spaces), and looking now at FIG. 3, novel air treatment device 5 may have a dark base 45 at the portions where it attaches to the ceiling of the laboratory space (and/or other building spaces), and a band of light 50 set about the perimeter portion of novel air treatment device 5 which projects into the laboratory space (and/or other building spaces). This band of light 50 may be purely decorative, e.g., it may be a light blue light to create a desired ambience for the laboratory space (and/or other building spaces); or the band of light 50 may be functional, e.g., it may be a "white" light to provide illumination for the laboratory space (and/or other building spaces).

Figure 4:
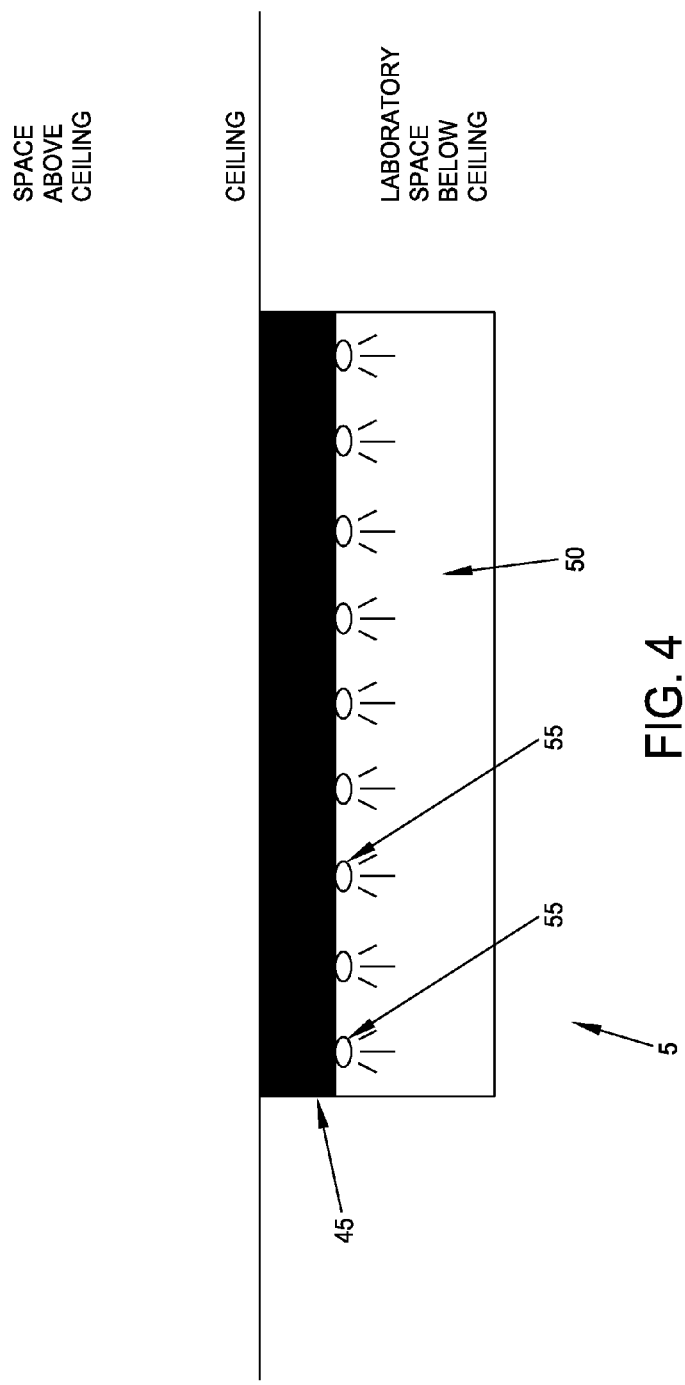
FIG. 4 is a schematic view of still another novel air treatment device formed in accordance with the present invention.
Figure 5:
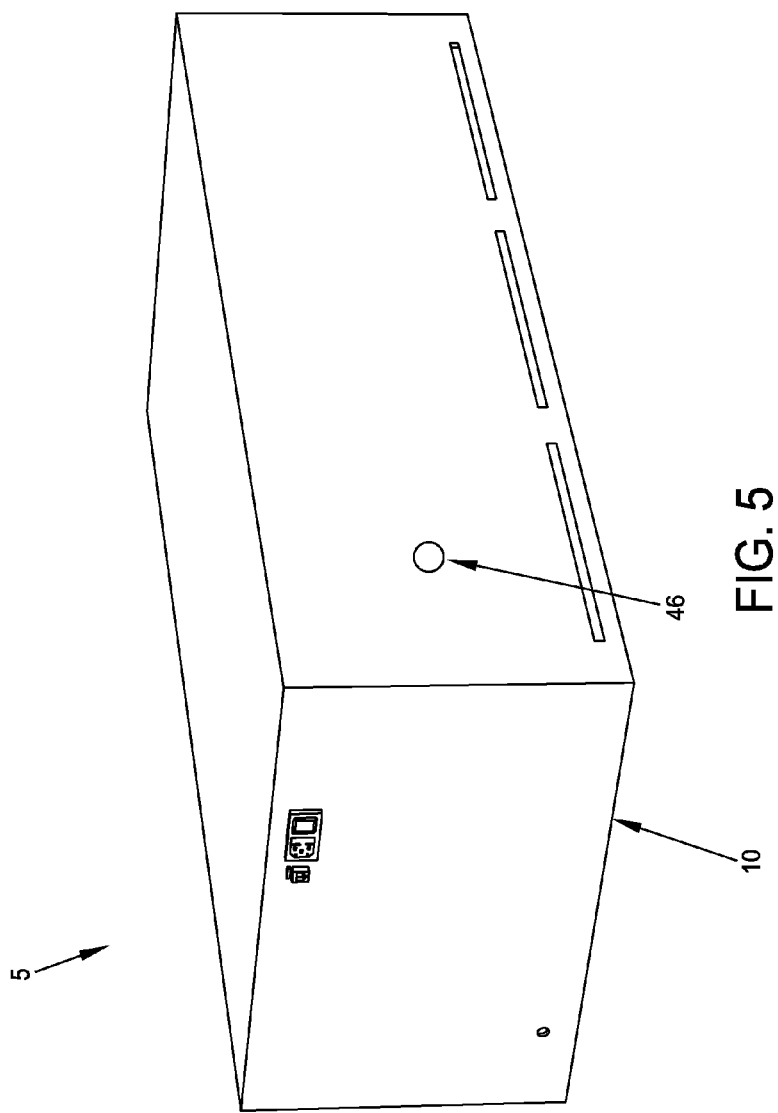
FIGS. 5-8 are schematic views of yet another novel air treatment device formed in accordance with the present invention.
Figure 6:
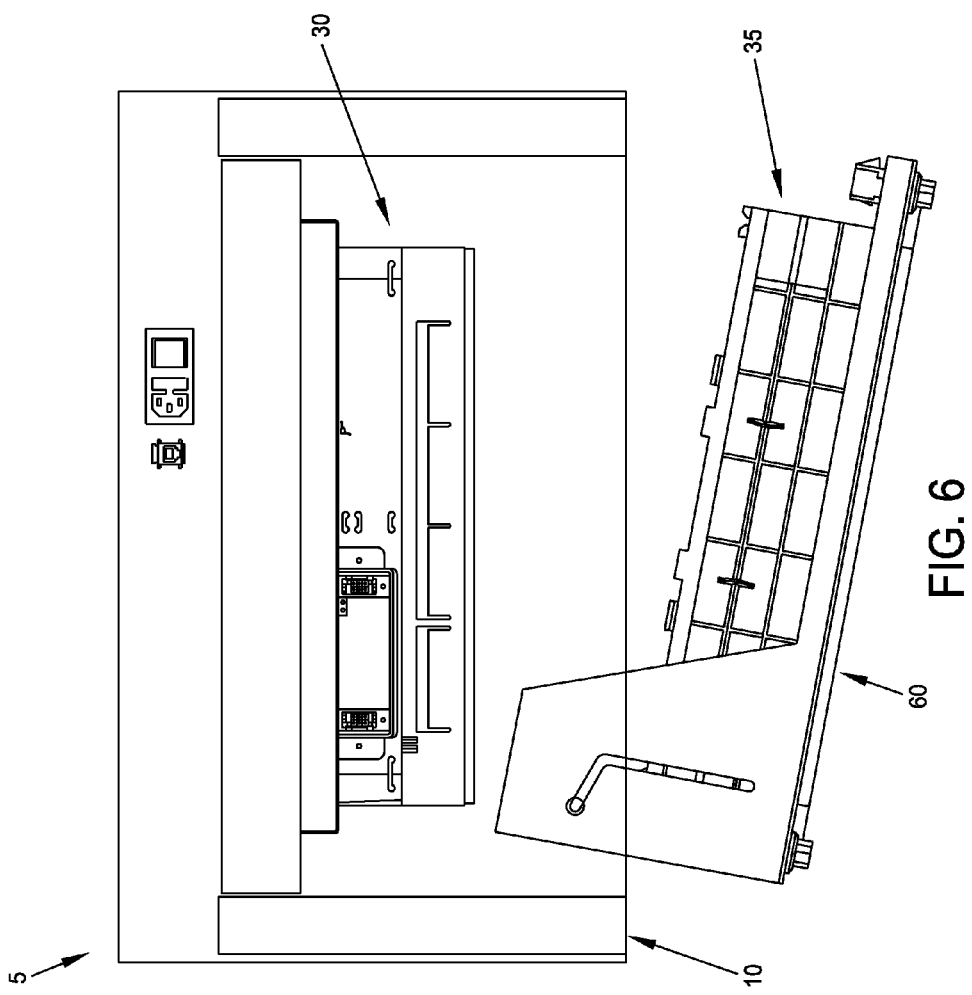
Figure 7:
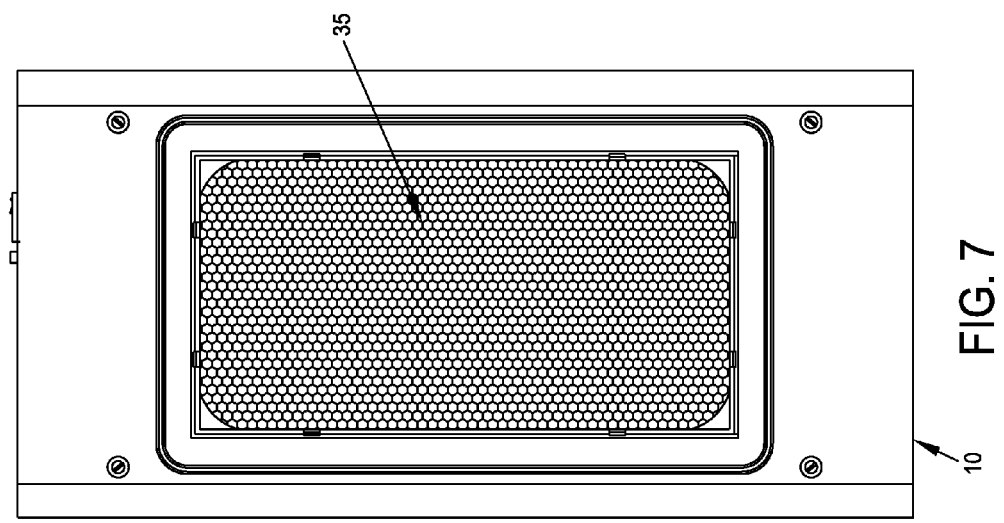
Figure 8:
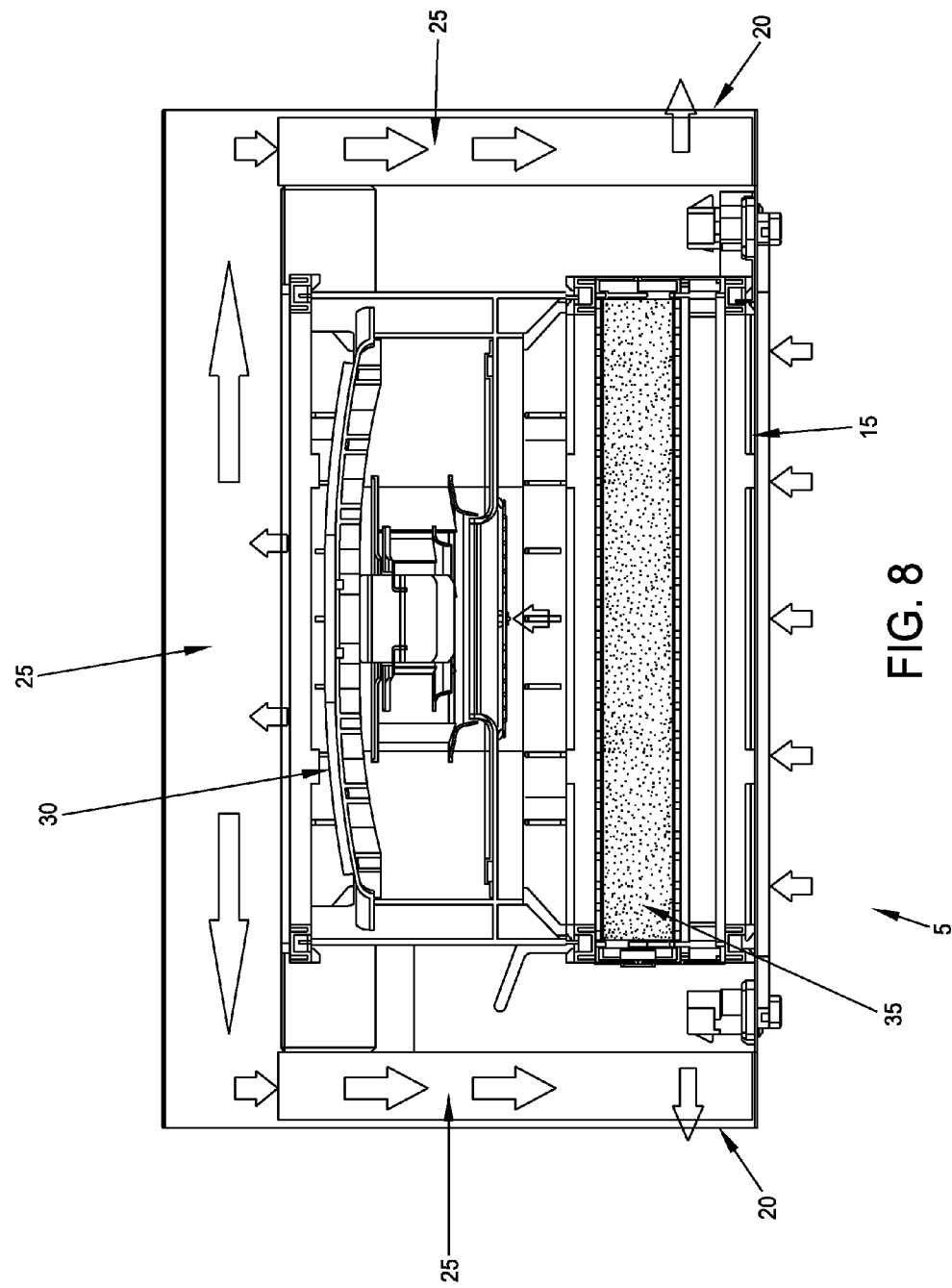
Figure 9:
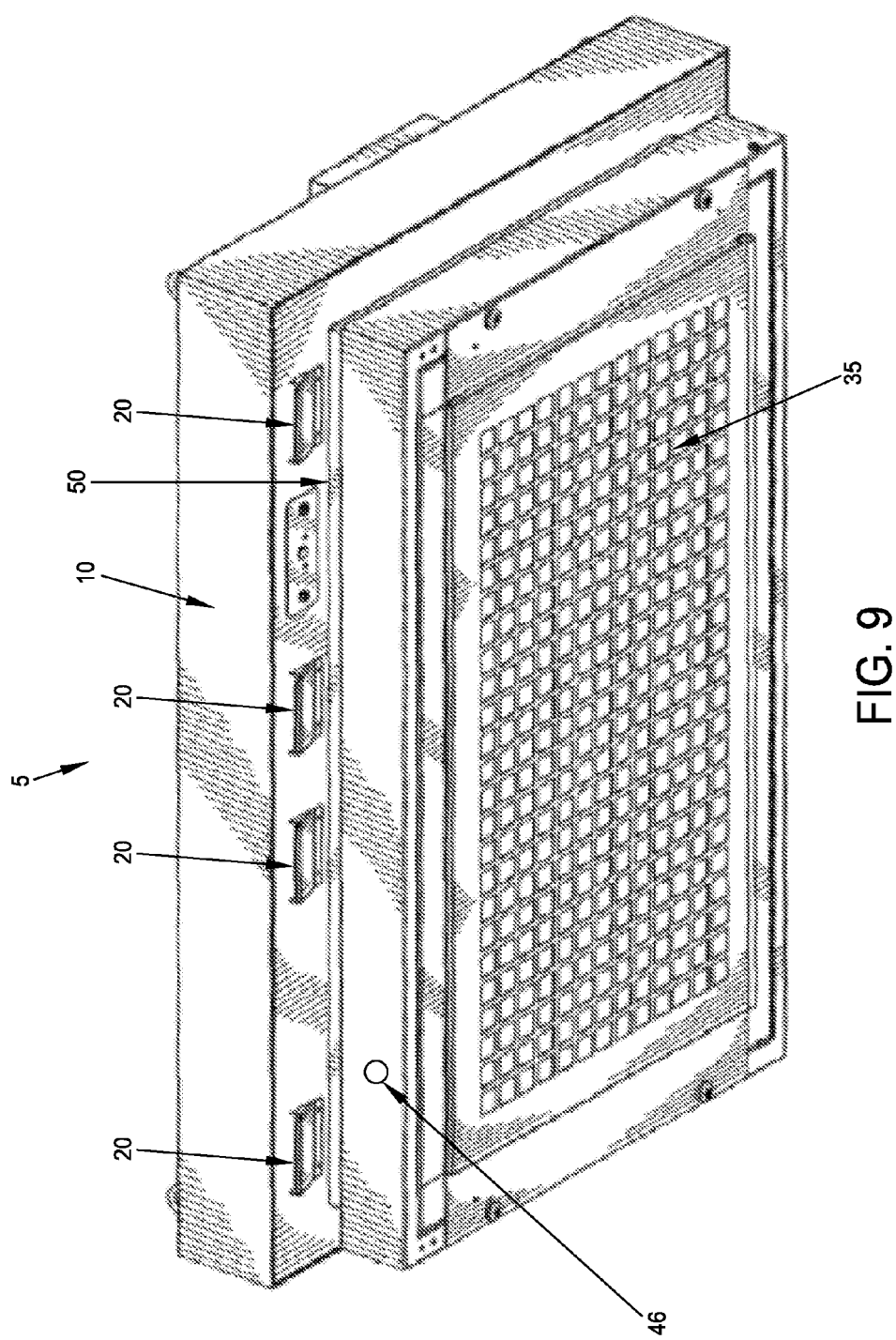
FIGS. 9-17 are schematic views of another novel air treatment device formed in accordance with the present invention.
Figure 10:
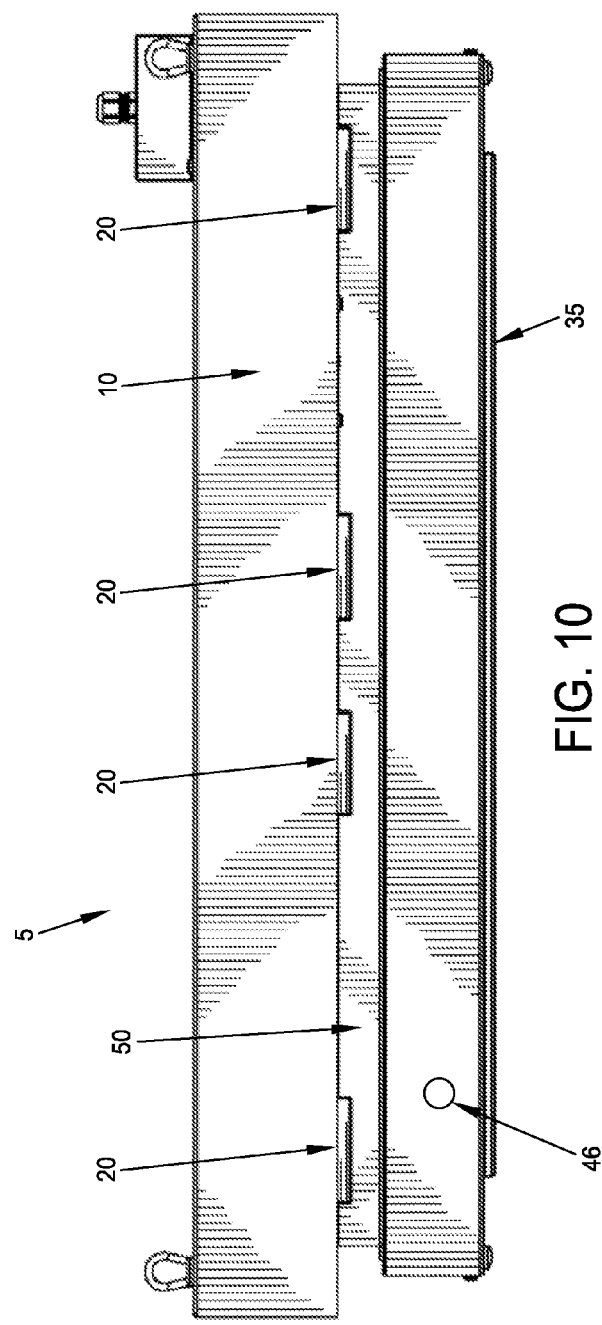
Figure 11:
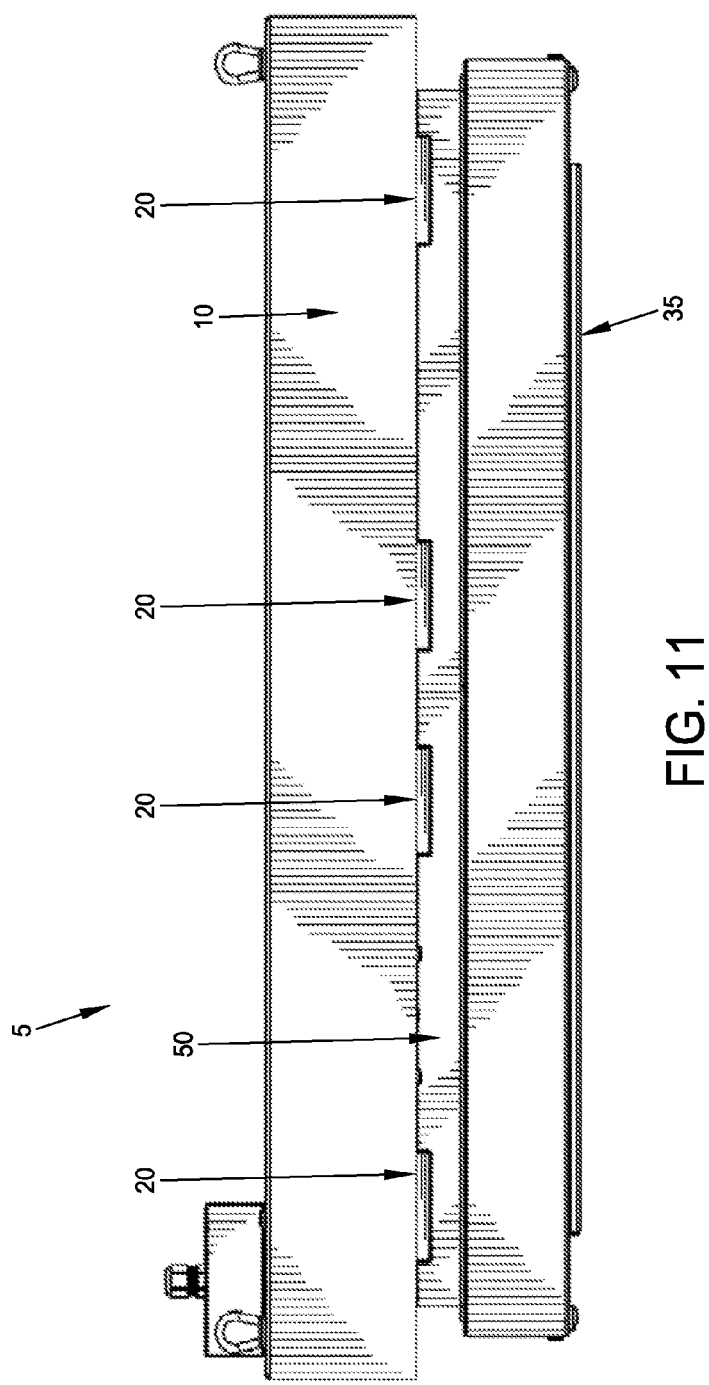
Figure 12:
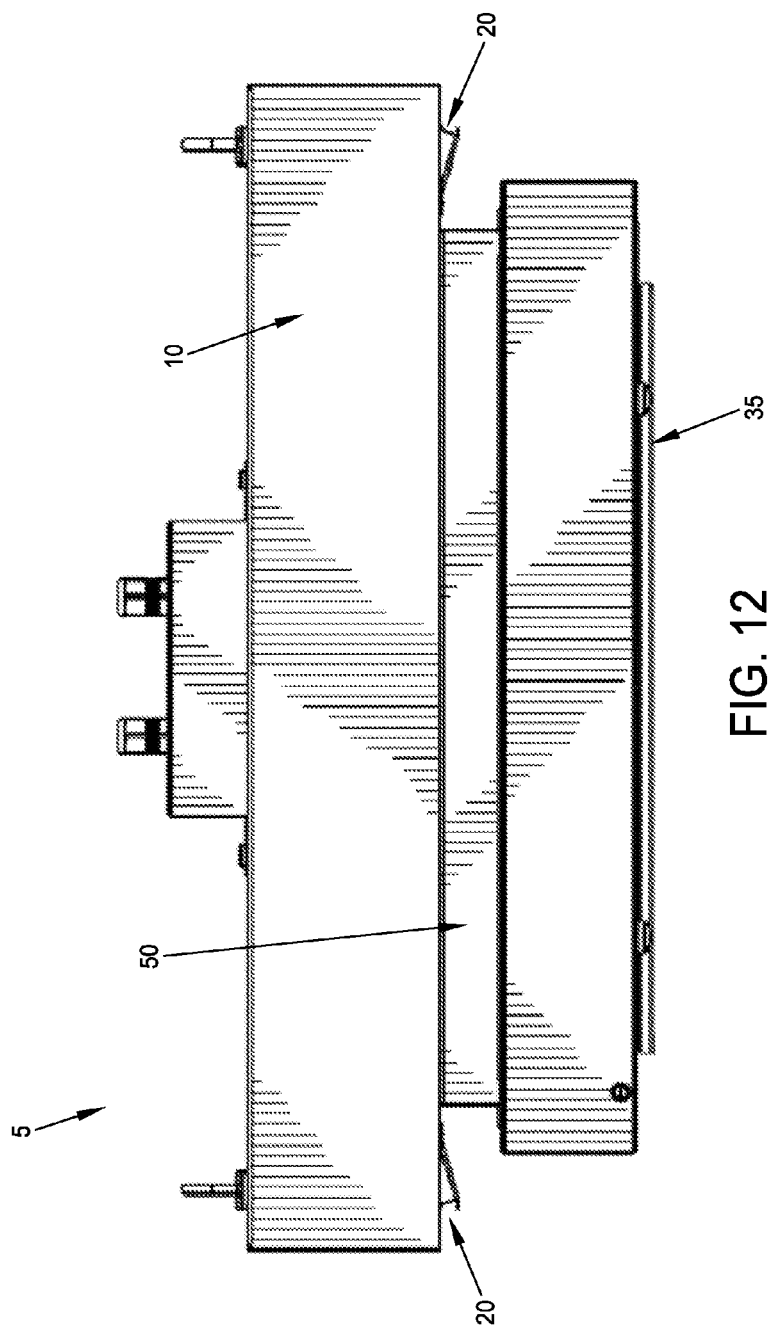
Figure 13:
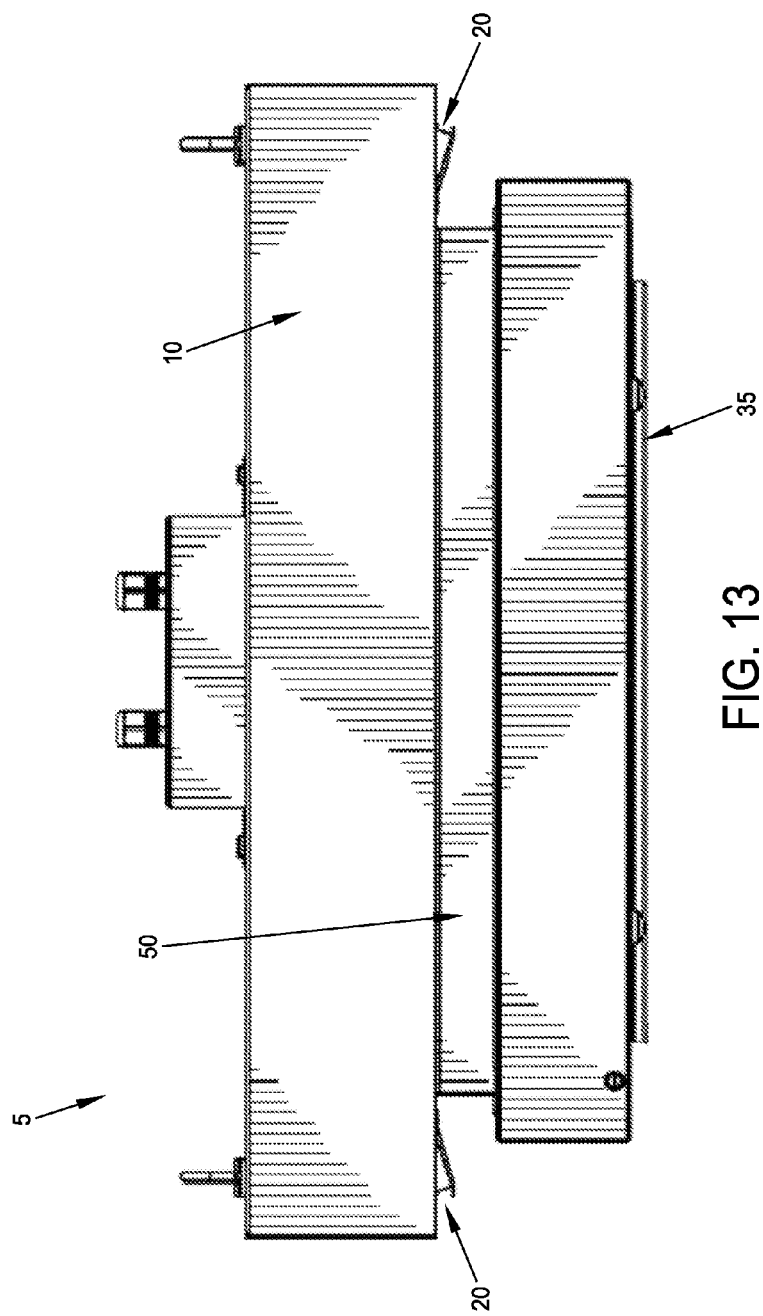
Figure 14:
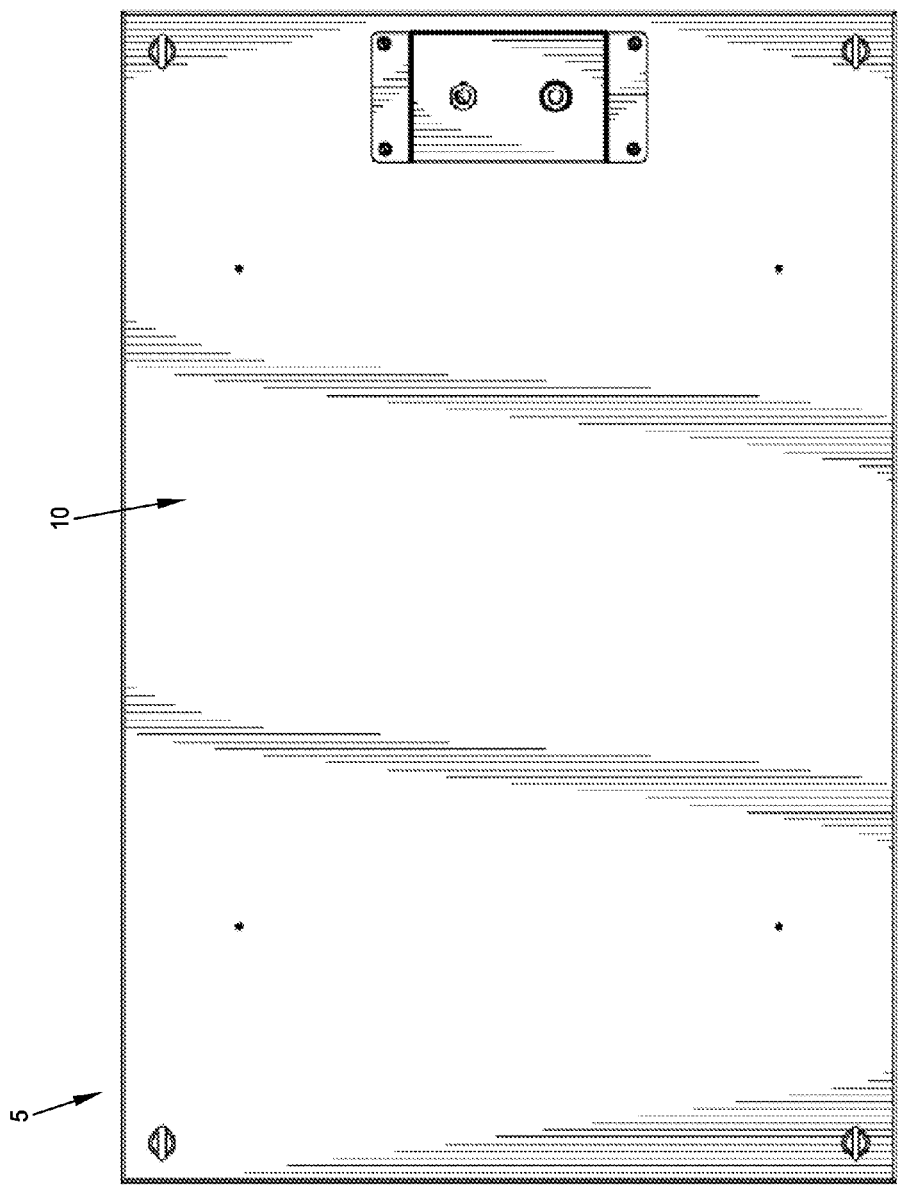
Figure 15:
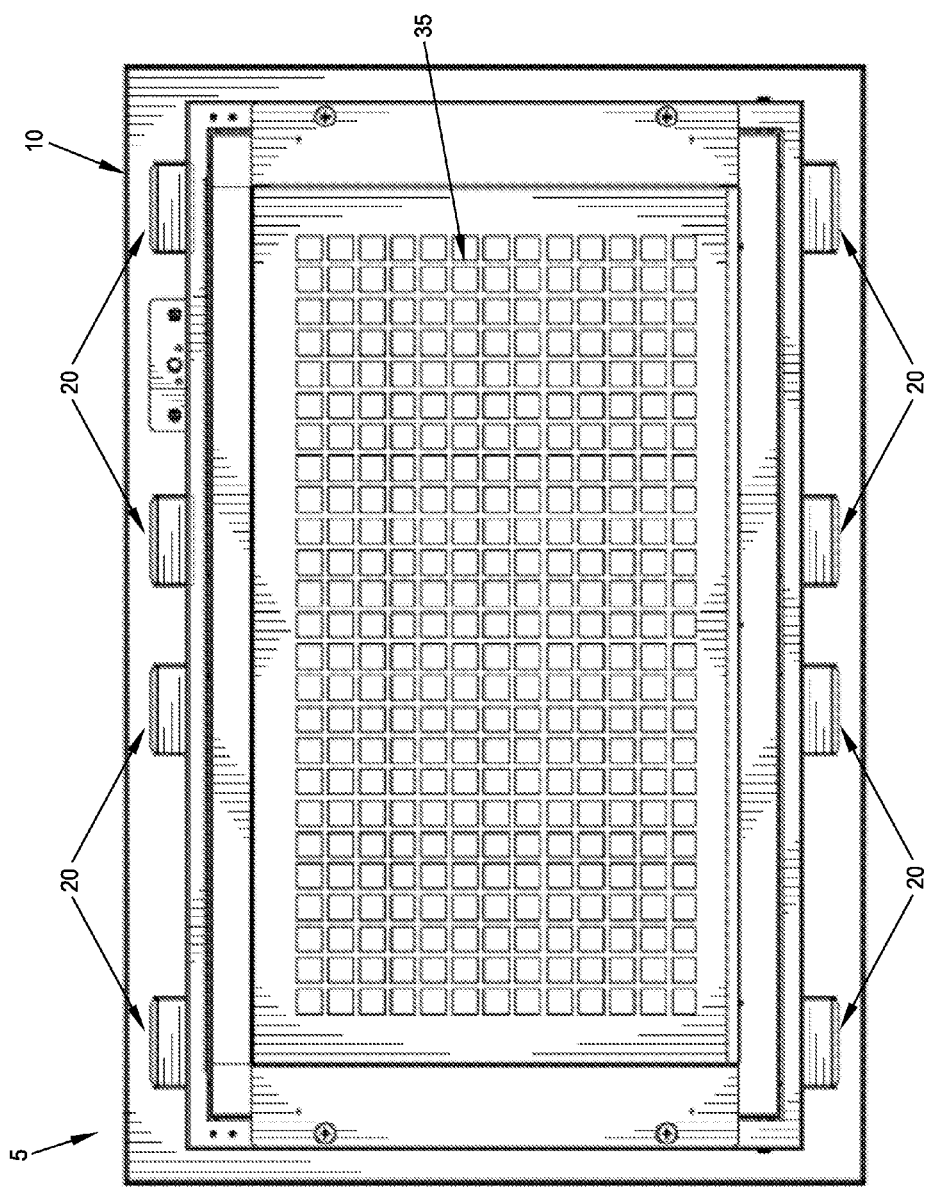
Figure 16:
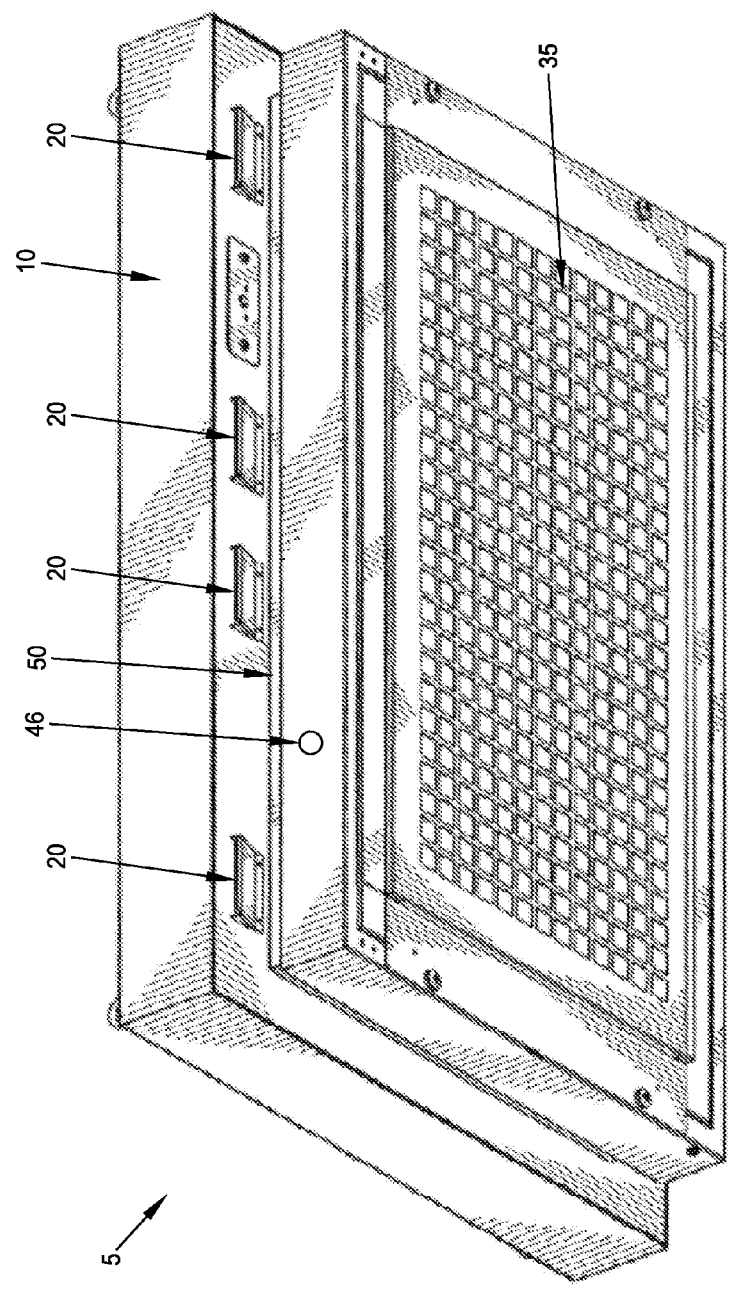
Figure 17:
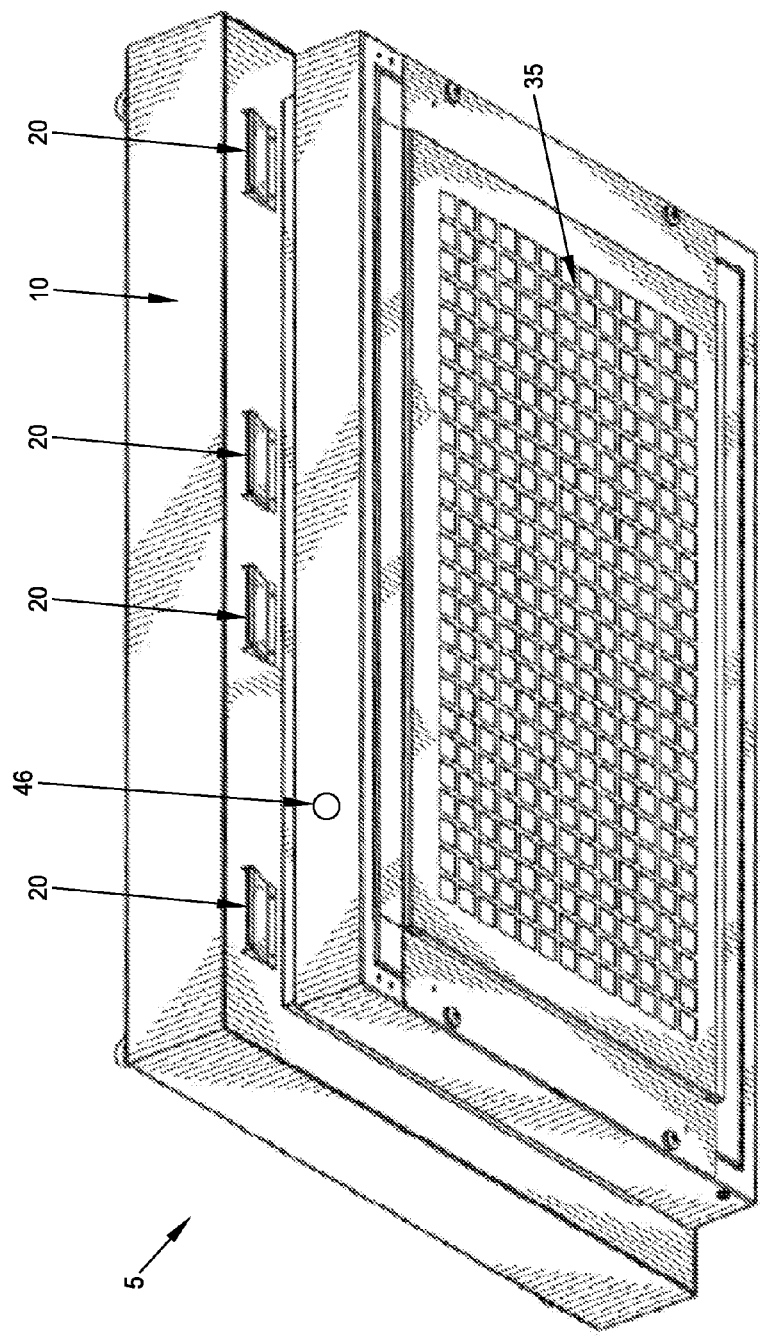

Furthermore, this band of light 50 may comprise a continuous band of light such as is shown in FIG. 3, or it may comprise an interrupted band of light created by a plurality of point sources 55 (e.g., LED lights) such as is shown in FIG. 4.

In addition, if desired, band of light 50 may be informational, e.g., band of light 50 may have one color (e.g., blue) if novel air treatment device 5 is functioning properly and/or if the air quality of the ambient air in the laboratory space (and/or other building spaces) remains above a predetermined air quality level; and band of light 50 may have another color (e.g., red) if the novel air treatment device is not functioning properly and/or if the air quality of the ambient air in the laboratory space (and/or other building spaces) deteriorates below a predetermined air quality level. Thus, in this form of the invention, band of light 50 may serve the same purpose as a visual, light-based alarm 43 (and, in this form of the invention, band of light 50 may be controlled by monitoring system 42, which is connected to sensors 40 and sensors 46).

In one preferred form of the invention, novel air treatment device 5 has its sensors 40 and sensors 46 connected to monitoring system 42, and monitoring system 42 is connected to a visual alarm 43 and/or band of light 50, and monitoring system 42 is programmed to change the state of alarm 43 and/or band of light 50, in the event that (i) the operational elements (e.g., circulation fan 30, filter 35, etc.) of novel air treatment device 5 are not functioning properly, or (ii) the air quality of the ambient air in the laboratory space (and/or other building spaces) should deteriorate below a predetermined air quality level. In this way, a person located in the laboratory space (and/or other building spaces) will know, simply by observing the state of alarm 43 and/or band of light 50, if the novel air treatment device requires servicing (e.g., to change a depleted filter 35, etc.) and/or if the air quality of the ambient air in the laboratory space (and/or other building spaces) has deteriorated below a predetermined air quality level. In this respect it will also be appreciated that, by placing novel air treatment device 5 on the ceiling of the laboratory space (and/or other building spaces), and by extending band of light 50 about the entire perimeter of housing 10 (or at least substantial portions thereof), a person located substantially anywhere in the laboratory space (and/or other building spaces) will generally have a direct line of sight to band of light 50 of novel air treatment device 5, whereby to be quickly and easily informed as to the operational status of novel air treatment device 5 and the air quality of the ambient air in the laboratory space (and/or other building spaces).

Alternatively, and/or additionally, novel air treatment device 5 may be configured so that band of light 50 may be continuously on if novel air treatment device 5 is functioning properly, and blinking if the novel air treatment device is not functioning properly.

FIGS. 5-8 show another preferred construction for novel air treatment device 5. In the construction shown in FIGS. 5-8, filter 35 is received in a "drop down" tray 60 which is hingedly connected to housing 10, i.e., when filter 35 is to be replaced, "drop down" tray 60 is lowered from housing 10, a new filter 35 is loaded, and then "drop down" tray 60 is reset into housing 10.

FIGS. 9-17 show still another preferred construction for novel air treatment device 5.

Modifications

While the present invention has been described in terms of certain exemplary preferred embodiments, it will be readily understood and appreciated by those skilled in the art that it is not so limited, and that many additions, deletions and modifications may be made to the preferred embodiments discussed herein without departing from the scope of the invention.

What is claimed is:

1. Apparatus for transforming the air exchange load of a higher air exchange rate space in a building into the air exchange load of a lower air exchange rate space in a building, said apparatus comprising:
   a housing for mounting to a surface of the higher air exchange rate space in the building;
   an air inlet formed in said housing;
   at least one air outlet formed in said housing;
   a passageway extending through said housing and connecting said air inlet to said at least one air outlet;
   a circulation fan disposed in said passageway so as to draw the ambient air of the higher air exchange rate space into said air inlet, through said passageway, and return that air to the higher air exchange rate space through said at least one air outlet; and
   a filter disposed in said passageway for purging non-particulate hazardous chemicals from the ambient air passing through said passageway, whereby to transform the air exchange load of the higher air exchange rate space into the air exchange load of a lower air exchange rate space.

2. Apparatus according to claim 1 wherein said housing is configured for securement to at least one of a ceiling and wall of the higher air exchange rate space.

3. Apparatus according to claim 1 wherein said housing is configured for securement to the ceiling of the higher air exchange rate space, wherein the ceiling is a drop-down ceiling, and further wherein a portion of the housing extends into the region above the drop-down ceiling.

4. Apparatus according to claim 1 wherein said filter is configured to remove at least one of fumes, vapors and volatiles from the air of the higher air exchange rate space.

5. Apparatus according to claim 1 wherein said filter is configured to remove at least one of solvents, acids, and bases from the air of the higher air exchange rate space.

6. Apparatus according to claim 1 further comprising at least one sensor for monitoring proper function of at least one of said fan and said filter.

7. Apparatus according to claim 6 further comprising an alarm connected to said at least one sensor for indicating malfunction of at least one of said fan and said filter.

8. Apparatus according to claim 7 wherein said alarm is a visual, light-based alarm.

9. Apparatus according to claim 6 wherein said at least one sensor is connected to the air exchange system of the building housing the higher air exchange rate space, such that in the event of a malfunction of at least one of said fan and said filter, the air exchange system of the building can increase the air exchange rate of the higher air exchange rate space.

10. Apparatus according to claim 1 further comprising at least one sensor for monitoring the ambient air of the higher air exchange rate space.

11. Apparatus according to claim 10 further comprising an alarm connected to said at least one sensor for indicating if the air quality of the ambient air of the higher air exchange rate space deteriorates below a predetermined air quality level.

12. Apparatus according to claim 1 further comprising at least one first sensor for monitoring proper function of at least one of said fan and said filter, at least one second sensor for monitoring the ambient air of the higher air exchange rate space, and an alarm connected to said at least one first sensor and said at least one second sensor for indicating the occurrence of at least one from the group consisting of a malfunction of at least one of said fan and said filter, and deterioration of the air quality of the ambient air of the higher air exchange rate space below a predetermined air quality level.

13. Apparatus according to claim 12 wherein said alarm is a visual, light-based alarm.

14. Apparatus according to claim 13 wherein said visual, light-based alarm comprises a band of light mounted to said housing.

15. Apparatus according to claim 14 wherein said visual, light-based alarm indicates the occurrence of an event by changing the color of said band of light.

16. Apparatus according to claim 14 wherein said visual, light-based alarm indicates the occurrence of an event by blinking said band of light.

17. A method for handling the air exchange load of a higher air exchange rate space in a building having an air exchange system, said method comprising:
providing apparatus for transforming the air exchange load of a higher air exchange rate space in a building into the air exchange load of a lower air exchange rate space in a building, said apparatus comprising:
a housing for mounting to a surface of the higher air exchange rate space in the building;
an air inlet formed in said housing;
at least one air outlet formed in said housing;
a passageway extending through said housing and connecting said air inlet to said at least one air outlet;
a circulation fan disposed in said passageway so as to draw the ambient air of the higher air exchange rate space into said air inlet, through said passageway, and return that air to the higher air exchange rate space through said at least one air outlet; and
a filter disposed in said passageway for purging non-particulate hazardous chemicals from the ambient air passing through said passageway;
positioning said apparatus in the higher air exchange rate space, and operating said apparatus so as to transform the air exchange load of the higher air exchange rate space into the air exchange load of a lower air exchange rate space; and
operating the air exchange system of the building so as to provide a lower air exchange rate to the higher air exchange rate space.

18. A method according to claim 17 further comprising at least one sensor for monitoring proper function of at least one of said fan and said filter.

19. A method according to claim 18 further comprising an alarm connected to said at least one sensor for indicating malfunction of at least one of said fan and said filter.

20. A method according to claim 19 wherein said alarm is a visual, light-based alarm.

21. A method according to claim 18 wherein said at least one sensor is connected to the air exchange system of the building and, in the event of a malfunction of at least one of said fan and said filter, operating the air exchange system of the building so as to provide a higher air exchange rate to the higher air exchange rate space.

22. A method according to claim 17 further comprising at least one sensor for monitoring the ambient air of the higher air exchange rate space.

23. A method according to claim 22 further comprising an alarm connected to said at least one sensor for indicating if the air quality of the ambient air of the higher air exchange rate space deteriorates below a predetermined air quality level.

24. A method according to claim 17 further comprising at least one first sensor for monitoring proper function of at least one of said fan and said filter, at least one second sensor for monitoring the ambient air of the higher air exchange rate space, and an alarm connected to said at least one first sensor and said at least one second sensor for indicating the occurrence of at least one from the group consisting of a malfunction of at least one of said fan and said filter, and deterioration of the air quality of the ambient air of the higher air exchange rate space below a predetermined air quality level.

25. A method according to claim 24 wherein said alarm is a visual, light-based alarm.

26. A method according to claim 25 wherein said visual, light-based alarm comprises a band of light mounted to said housing.

27. A method according to claim 26 wherein said visual, light-based alarm indicates the occurrence of an event by changing the color of said band of light.

28. A method according to claim 26 wherein said visual, light-based alarm indicates the occurrence of an event by blinking said band of light.

29. Apparatus for transforming the air exchange load of a higher air exchange rate space in a building into the air exchange load of a lower air exchange rate space in a building, said apparatus comprising:
a housing for mounting to a surface of the higher air exchange rate space in the building;
an air inlet formed in said housing;
at least one air outlet formed in said housing;
a passageway extending through said housing and connecting said air inlet to said at least one air outlet;
a circulation fan disposed in said passageway so as to draw the ambient air of the higher air exchange rate space into said air inlet, through said passageway, and return that air to the higher air exchange rate space through said at least one air outlet;
a filter disposed in said passageway for purging non-particulate hazardous chemicals from the ambient air passing through said passageway, whereby to transform the air exchange load of the higher air exchange rate space into the air exchange load of a lower air exchange rate space;
at least one sensor for monitoring proper function of at least one of said fan and said filter; and
means for connecting said at least one sensor to a master air control system of the building, such that in the event of a malfunction of at least one of said fan and said filter, the master air control system of the building increases the air exchange rate of the higher air exchange rate space.

30. A method for handling the air exchange load of a higher air exchange rate space in a building having an air exchange system, said method comprising:
providing apparatus for transforming the air exchange load of a higher air exchange rate space in a building into the air exchange load of a lower air exchange rate space in a building, said apparatus comprising:
a housing for mounting to a surface of the higher air exchange rate space in the building;
an air inlet formed in said housing;
at least one air outlet formed in said housing;
a passageway extending through said housing and connecting said air inlet to said at least one air outlet;
a circulation fan disposed in said passageway so as to draw the ambient air of the higher air exchange rate space into said air inlet, through said passageway, and return that air to the higher air exchange rate space through said at least one air outlet;
a filter disposed in said passageway for purging non-particulate hazardous chemicals from the ambient air passing through said passageway;
at least one sensor for monitoring proper function of at least one of said fan and said filter; and
means for connecting said at least one sensor to a master air control system of the building;
positioning said apparatus in the higher air exchange rate space, and operating said apparatus so as to transform the air exchange load of the higher air exchange rate space into the air exchange load of a lower air exchange rate space;

operating the air exchange system of the building so as to provide a lower air exchange rate to the higher air exchange rate space; and in the event of a malfunction of at least one of said fan and said filter, increasing the air exchange rate of the higher air exchange rate space.

\* \* \* \* \*